(12) United States Patent
Ishii

(10) Patent No.: US 9,183,478 B2
(45) Date of Patent: Nov. 10, 2015

(54) METHOD AND APPARATUS FOR PERFORMING AUTOMATIC SWITCHING OF MEDIA

(71) Applicant: Oki Data Corporation, Tokyo (JP)

(72) Inventor: Miwako Ishii, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 14/161,750

(22) Filed: Jan. 23, 2014

(65) Prior Publication Data
US 2014/0211226 A1   Jul. 31, 2014

(30) Foreign Application Priority Data
Jan. 25, 2013   (JP) ................. 2013-012634

(51) Int. Cl.
| | | |
|---|---|---|
| G06K 15/00 | (2006.01) | |
| H04N 1/00 | (2006.01) | |
| H04N 1/23 | (2006.01) | |
| G06K 15/02 | (2006.01) | |

(52) U.S. Cl.
CPC ........ *G06K 15/4065* (2013.01); *H04N 1/00623* (2013.01); *H04N 1/2323* (2013.01); *G06K 15/1823* (2013.01); *G06K 15/408* (2013.01); *H04N 2201/0082* (2013.01)

(58) Field of Classification Search
CPC .......... G06K 15/4065; G06K 15/1823; G06K 15/408; H04N 2201/0082
USPC ......... 358/1.12, 1.1, 1.15, 1.2; 399/14, 23, 69
See application file for complete search history.

(56) References Cited

U.S. PATENT DOCUMENTS

| | | | |
|---|---|---|---|
| 5,031,116 A * | 7/1991 | Shukunami et al. ........... 358/1.2 |
| 2002/0044789 A1 * | 4/2002 | Nanataki et al. ................ 399/69 |
| 2002/0191201 A1 * | 12/2002 | Kimbell et al. ................ 358/1.2 |
| 2004/0141762 A1 * | 7/2004 | Okamoto et al. ............... 399/23 |
| 2006/0176531 A1 * | 8/2006 | Sawada ........................ 358/528 |
| 2007/0195335 A1 * | 8/2007 | Tanaka ........................... 358/1.1 |
| 2007/0201053 A1 * | 8/2007 | Sellers et al. ................. 358/1.2 |
| 2008/0158624 A1 * | 7/2008 | Hayashi ........................ 358/498 |
| 2011/0267640 A1 * | 11/2011 | Takahashi .................... 358/1.15 |
| 2013/0113158 A1 * | 5/2013 | Miyazawa .................... 271/227 |
| 2013/0136462 A1 * | 5/2013 | Iida ................................ 399/23 |

FOREIGN PATENT DOCUMENTS

| | | | |
|---|---|---|---|
| JP | S62-080081 A | 4/1987 |
| JP | H06-218979 A | 8/1994 |
| JP | H09-149233 A | 6/1997 |

(Continued)

*Primary Examiner* — David S Cammack
(74) *Attorney, Agent, or Firm* — Marvin A. Motsenbocker; Mots Law, PLLC

(57) ABSTRACT

An image formation apparatus includes: a tray selection unit configured, based on print size information designated in print data, to select one of medium trays; an edit region setup unit configured, when the size of the print medium in the selected medium tray is different from print medium corresponding to the designated print medium size, to analyze the print data based on an orientation of the print medium in the selected medium tray and to set an edit region of the print data; a drawing unit configured, on the basis of the print data and the edit region, to create image data within the edit region; and an image formation unit configured to print the image data on the print medium fed from the selected medium tray.

15 Claims, 11 Drawing Sheets

(56) References Cited

FOREIGN PATENT DOCUMENTS

| JP | 2002-248831 A | 9/2002 |
| JP | 2005-112543 A | 4/2005 |
| JP | 2006-150890 A | 6/2006 |
| JP | 2007-007998 A | 1/2007 |

* cited by examiner

METHOD AND APPARATUS FOR PERFORMING AUTOMATIC SWITCHING OF MEDIA

CROSS REFERENCE TO RELATED APPLICATIONS

This application claims priority based on 35 USC 119 from prior Japanese Patent Application No. 2013-012634 filed on Jan. 25, 2013, entitled "IMAGE FORMATION APPARATUS", the entire contents of which are incorporated herein by reference.

BACKGROUND OF THE INVENTION

1. Field of the Invention

This disclosure relates to an image formation apparatus which processes image data containing character information.

2. Description of Related Art

A conventional image formation apparatus is equipped with a function that in the case of creating and printing print image data by interpreting a page description language (PDL), when there are two types of sheets with sheet sizes close to each other (such as the A4 size and the letter size), the image formation apparatus performs printing by regarding these sheets as being coincident in size with each other. For example, when print data prepared in the A4 size, which is a typical sheet size in Japan, is to be printed somewhere in the United States where a typical sheet size is the letter-size and when A4 sheets are not available, the above-mentioned image formation apparatus implements the function, thereby printing the print data on a letter-size sheet having the size close to the A4 size.

This image formation apparatus prints the print data on the sheet having the different sheet size from the sheet size designated in the print data, and therefore poses a problem that a toner corresponding to a portion of the print image that is out of the sheet stains the image formation apparatus or the next sheet to be fed. To solve this problem, there is also proposed an image formation apparatus equipped with functions to detect the size of a fed sheet, and to perform printing after deleting a portion of print image that would be printed out of the sheet (see Patent Document 1: Japanese Patent Application Publication No. H06-218979).

SUMMARY OF THE INVENTION

However, the conventional technique has the following problem. Specifically, there is a printer which allows feeding of sheets both in the portrait orientation and in the landscape orientation with respect to a moving direction of the sheets. If a print operation is performed while simply regarding the two sheet sizes as being coincident as described above, then a print result varies significantly depending on the orientation of a fed sheet because the longitudinal and lateral lengths of the sheet vary depending on the orientation of the fed sheet (for example, the operation brings about a print result without any portions where the print image extends outside the sheet when the sheet is fed in the portrait orientation whereas the operation brings about a print result with a portion where the print image extends outside the sheet when the sheet is fed in the landscape orientation). An object of an embodiment of the invention is to reduce developer such as a toner that is printed out of a print medium regardless of an orientation of the print medium.

An aspect of the invention provides an image formation apparatus that includes: a tray selection unit configured, based on print size information designated in print data, to select one of medium trays; an edit region setup unit configured, when the size of the print medium in the selected medium tray is different from print medium corresponding to the designated print medium size, to analyze the print data based on an orientation of the print medium in the selected medium tray and to set an edit region of the print data; a drawing unit configured, on the basis of the print data and the edit region, to create image data within the edit region; and an image formation unit configured to print the image data on the print medium fed from the selected medium tray.

The above aspect of the invention can reduce an amount of developer that is printed to an area out of the print medium regardless of the orientation of the print medium.

DETAILED DESCRIPTION OF EMBODIMENTS

Figure 1:
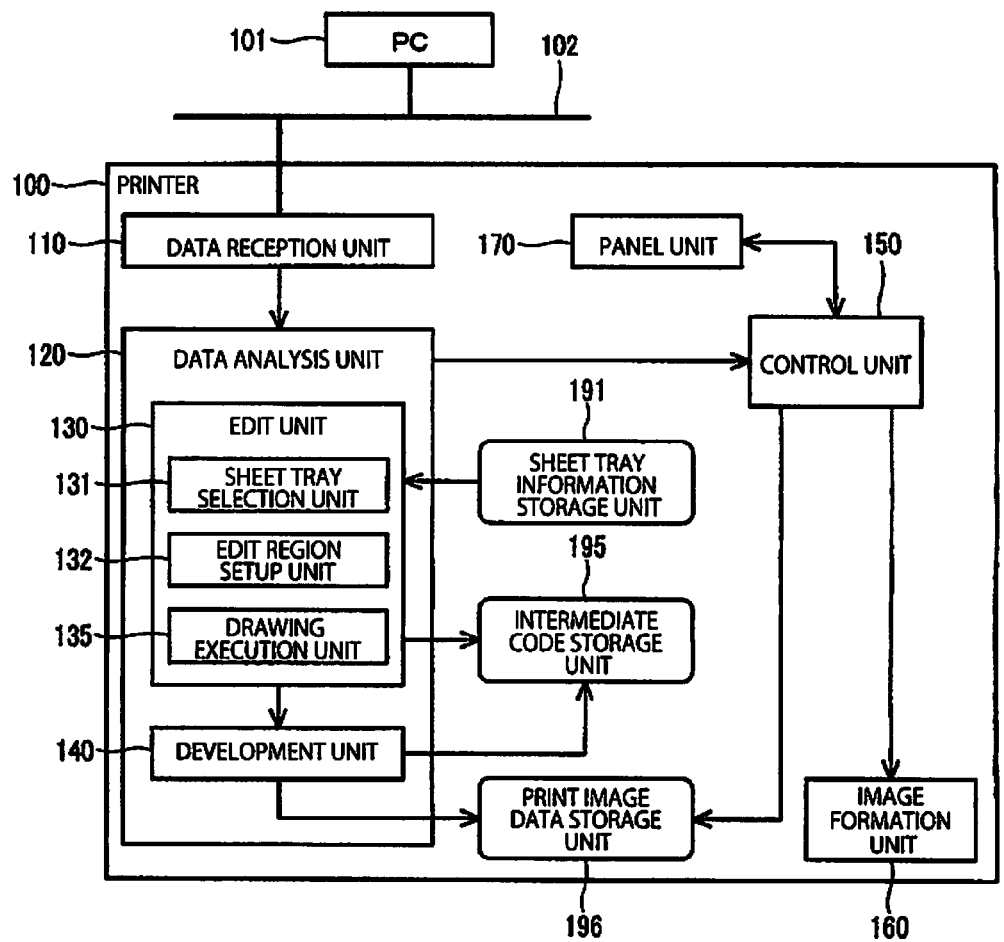
FIG. 1 is a block diagram illustrating a configuration of a printer of a first embodiment.

Descriptions are provided hereinbelow for embodiments based on the drawings. In the respective drawings referenced herein, the same constituent elements are designated by the same reference numerals and duplicate explanation concerning the same constituent elements is omitted. All of the drawings are provided to illustrate the respective examples only.

Embodiments of an image formation apparatus of the invention are described below with reference to the drawings.

[First Embodiment]

FIG. 1 is a block diagram illustrating a configuration of a printer of a first embodiment. In FIG. 1, printer 100 as an image formation apparatus is connected to PC (personal computer) 101 as a host apparatus or an external apparatus through communication line 102. Printer 100 is configured to perform printing on a print medium (a sheet) fed from a sheet tray on the basis of print data received from PC 101. PC 101 transmits the print data to printer 100. The print data includes PDL data, which describes a print target document using codes interpretable by data analysis unit 120 of printer 100.

Printer 100 includes data reception unit 110, data analysis unit 120, control unit 150, image formation unit 160, panel unit 170, sheet tray information storage unit 191, intermediate code storage unit 195, and print image data storage unit 196. Here, the intermediate code is a code which is temporarily created in the process of conversion from the print data into print image data. Data reception unit 110 receives the print data transmitted from PC 101 through communication line 102, and forwards the print data to data analysis unit 120.

Data analysis unit 120 analyzes the print data received from data reception unit 110, creates the print image data to be printed on the print medium, and stores the print image data in print image data storage unit 196. Data analysis unit 120 includes edit unit 130 and development unit 140, which are configured to send a notice to control unit 150. Edit unit 130 creates an intermediate code by analyzing the PDL data, stores the created intermediate code in intermediate code storage unit 195, and sends a notice to development unit 140. Edit unit 130 further includes sheet tray selection unit 131, edit region setup unit 132, and drawing execution unit 135.

Sheet tray selection unit 131 selects one of sheet trays on the basis of information indicating print size or page size (for example, a sheet size as a print medium size in this embodiment) designated in the print data. Here, each of the sheet trays can contain print medium on which the print data is to be printed. Sheet tray selection unit 131 then determines an edit direction of the print data in accordance with the orientation of the print medium in the selected sheet tray. Sheet tray selection unit 131 selects one of sheet trays corresponding to the print data on the basis of the information stored in sheet tray information storage unit 191 indicating the sheet size set for each sheet tray.

Sheet tray information storage unit 191 is a storage unit such as a memory which stores the information on the sheet size and the orientation of the sheet set for each sheet tray. Sheet tray information storage unit 191 stores the information, for instance, that sheet tray 1 contains a B5 size sheet in the landscape orientation, sheet tray 2 contains a B4 size sheet in the portrait orientation, and sheet tray 3 contains an A4 size sheet in the portrait orientation. Here, the portrait orientation is the orientation (direction) of the sheet contained in the sheet tray in such a manner that the longitudinal direction of the sheet (the print medium) corresponds to a moving direction of the sheet along which the sheet is fed from the sheet tray. The landscape orientation is the orientation (direction) of the sheet contained in the sheet tray in such a manner that the lateral direction of the sheet (the print medium) corresponds to the moving direction of the sheet.

Edit region setup unit 132 analyzes the print data on the basis of the edit orientation determined by sheet tray selection unit 131. When the size of the print medium designated in the printed data is different from the size of the print medium in the selected sheet tray, edit region setup unit 132 sets (determines) an edit region (a clip region) for the print data in conformity to the size of the print medium in the selected sheet tray. When the printed data is printed in accordance with the orientation of the sheet set in the sheet tray selected by sheet tray selection unit 131, edit region setup unit 132 sets information on the print area with respect to the sheet in the selected sheet tray as an intermediate code. The intermediate code thus created is stored in intermediate code storage unit 195.

Drawing execution unit 135 as a drawing unit creates an intermediate code in order to create image data within the edit region on the basis of the print data and the edit region determined (set) by edit region setup unit 132. Drawing execution unit 135 edits the print data so as to conform to an orientation corresponding to the orientation of the sheet in the selected sheet tray, thereby creating the intermediate code. The intermediate code thus created is stored in intermediate code storage unit 195. Development unit 140 as the drawing unit reads the intermediate codes out of intermediate code storage unit 195 in response to the notification from edit unit 130, then creates print image data by analyzing the read intermediate codes, and stores the print image data in print image data storage unit 196.

Control unit 150 receives a notice of completion of creation of the print image data from data analysis unit 120. Then, control unit 150 reads the print image data out of print image data storage unit 196 and forwards the print image data to image formation unit 160. Subsequently, control unit 150 controls components of image formation unit 160 in such a way as to transfer a developer image (for example, a toner) onto the medium on the basis of the print image data, to fix the developer image onto the medium by thermal fixation therefore forming an image on the medium, and to convey and output the medium having the image thereon. Control unit 150 is a controller such as a CPU (central processing unit), and controls operations of entire printer 100 on the basis of a control program (software) stored in a storage unit such as a memory.

Image formation unit 160 prints the image data created by development unit 140 on the print medium fed from the selected sheet tray. Image formation unit 160 includes not-illustrated components, namely, the sheet trays (medium storage units), a conveyance unit, a transfer unit, a thermal fixation unit, and the like. Image formation unit 160 executes print processing in accordance with control by control unit 150. Panel unit 170 serving as a display unit includes a display module such as a display screen and an input module such as a touch panel. When the sheet whose size corresponds to the sheet size designated in the print data is not found in any of the sheet trays and printer 100 thus cannot print the print data on any sheet from the sheet trays, panel unit 170 can display indication requesting sheets whose size is the same as the designated sheet size in the print data as instructed by control unit 150.

In the embodiment, when none of sheet trays contains sheets whose size corresponds to the designated sheet size and at least one sheet tray contains sheet whose size corresponds to a substitute sheet size, the printer 100 prints on the substitute sheet. Inputting of substitute sheet size information can be done through data reception unit 110 or panel unit 170. Such a substitute sheet size information may comprise a name (type) of a sheet (print medium) such as the letter sheet or the A4 sheet as a standard sheet size, a size of a sheet such lengths of long side x (mm) and short side y (mm) of the sheet, or a size of a print area for a sheet such as lengths of long side x (mm) and short side y (mm) of the print area (page size).

Also the above described designated print size information may comprise a name (type) of a sheet (print medium) such as the letter sheet or the A4 sheet as a standard sheet size, a size of a sheet such lengths of long side x (mm) and short side y (mm) of the sheet, or a size of a print area for a sheet such as lengths of long side x (mm) and short side y (mm) of the print area (page size).

Figure 2:
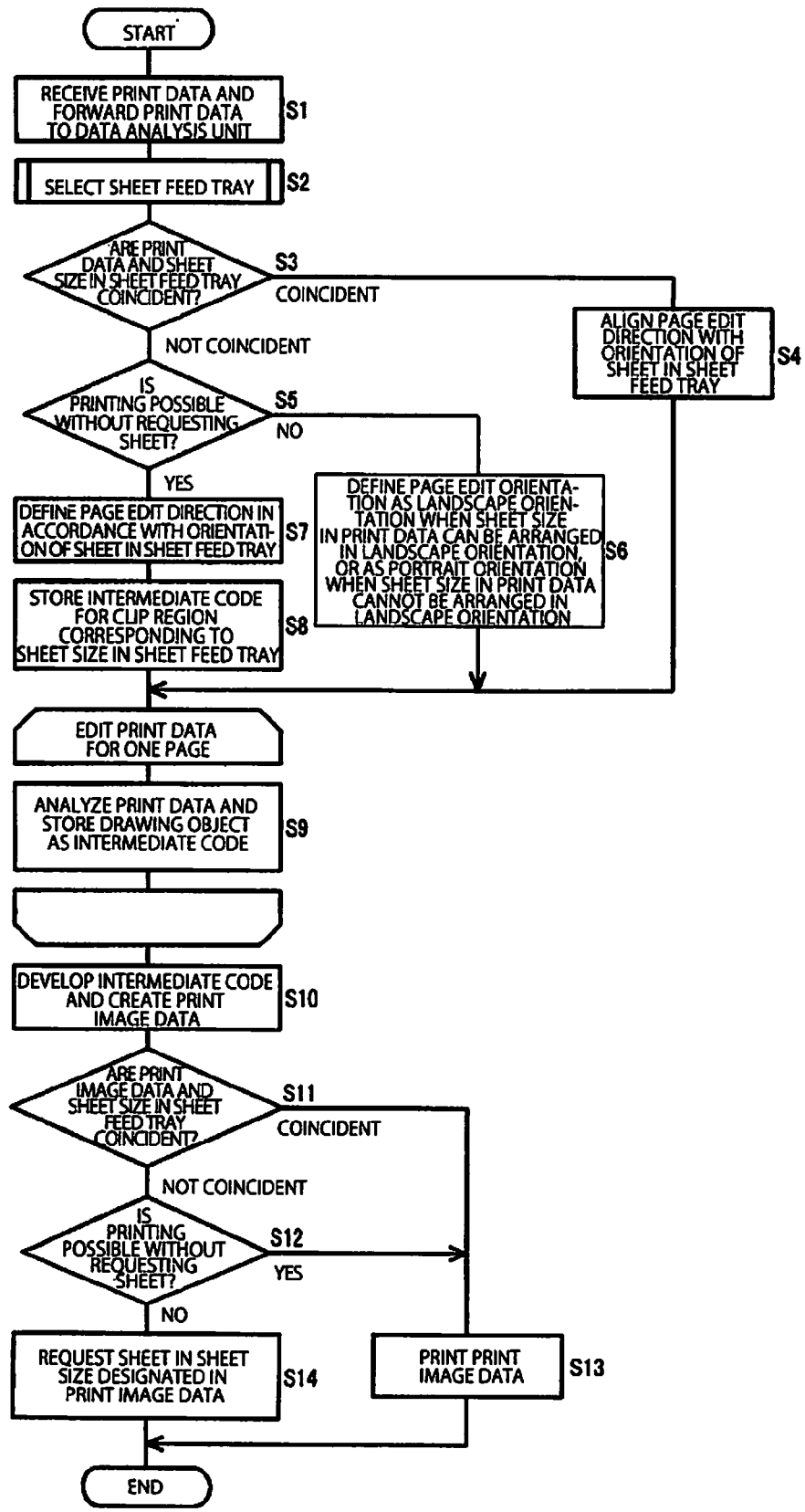
FIG. 2 is a flowchart illustrating a flow of print processing of the first embodiment.

Operations of the above-described configuration are described below. First, the print processing to be performed by printer 100 is described with reference to FIG. 1 and in accordance with steps indicated with S in a flowchart of FIG. 2 that represents a flow of the print processing of the first embodiment. In step S1, printer 100 receives print data by using data reception unit 110, and forwards the print data to data analysis unit 120. In step S2, data analysis unit 120 reads the print data forwarded from data reception unit 110 by using edit unit 130, and sheet tray selection unit 131 selects one of the sheet trays in accordance with a designated sheet size and a designated sheet tray that are designated in the print data.

Figure 3:
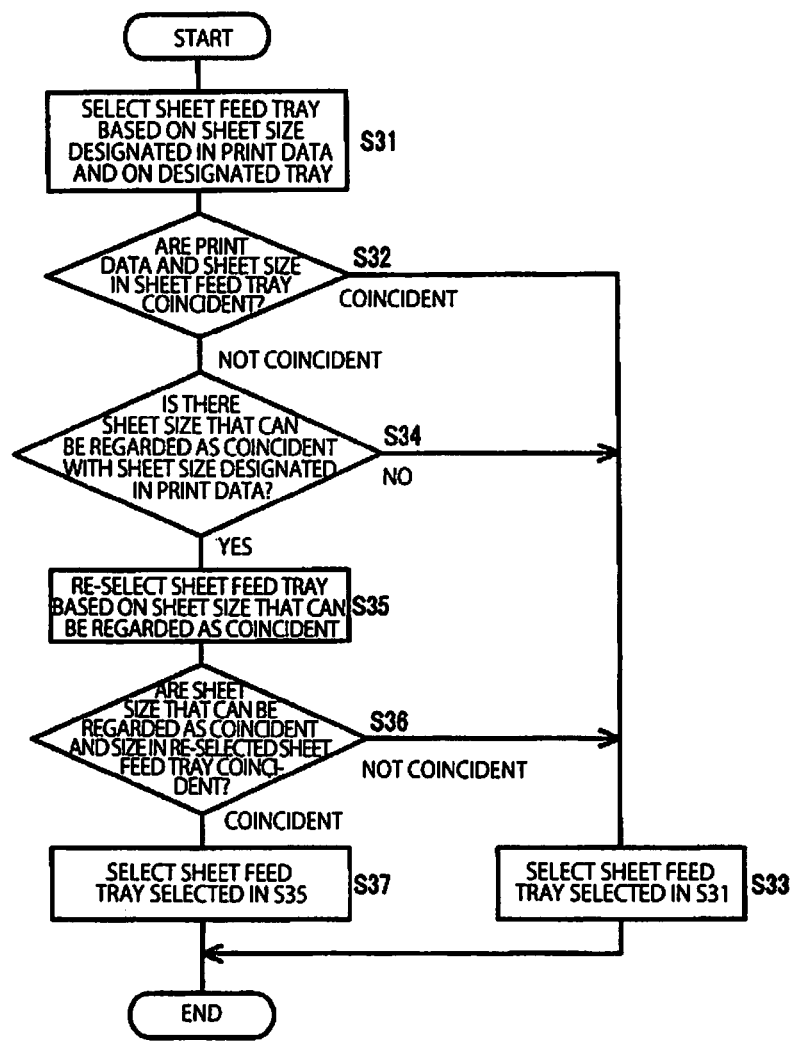
FIG. 3 is a flowchart illustrating sheet tray selection processing of the first embodiment.

Here, sheet tray selection processing to be performed by sheet tray selection unit 131 is described in accordance with steps indicated with S in a flowchart of FIG. 3 that represents a flow of the sheet tray selection processing of the first embodiment. In step S31, sheet tray selection unit 131 searches information stored in sheet tray information storage unit 191 on the basis of the designated sheet size and the designated sheet tray designated in the print data, and selects one of the sheet trays accordingly.

Figure 4A:
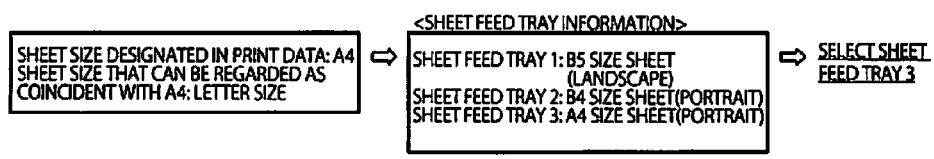
FIGS. 4A to 4C are explanatory diagrams of examples of sheet tray selection of the first embodiment.

In step S32, sheet tray selection unit 131 judges whether or not the sheet size designated in the print data is coincident with the sheet size in the sheet tray selected instep S31. The processing proceeds to step S33 when sheet tray selection unit 131 judges that the sheet size designated in the print data is coincident with the sheet size in the sheet tray, or proceeds to step S34 when sheet tray selection unit 131 judges that the sheet sizes are not coincident. For example, when the sheet size designated in the print data is the A4 size and sheet tray 3 contains the A4 size sheet as illustrated in FIG. 4A, sheet tray selection unit 131 selects sheet tray 3 (A4 size sheet (portrait)). In step S33, sheet tray selection unit 131 selects the sheet tray that is selected in step S31, and terminates the processing.

In step S34, upon the judgment that the sheet size designated in the print data is not coincident with the sheet size in the sheet tray, sheet tray selection unit 131 judges whether or not any of the sheet trays contains a sheet (s) whose size can be regarded as coincident with the sheet size designated in the print data (that is, the sheet tray selection unit 131 judges whether or not any of the sheet trays contains a sheet(s) whose size is the same as a substitute sheet size predetermined for the designated sheet size). The processing proceeds to step S35 when sheet tray selection unit 131 judges that there is a sheet tray that contains the sheet (s) whose size can be regarded as coincident with the sheet size designated in the print data, or proceeds to step S33 when sheet tray selection unit 131 judges that there is not an applicable sheet size. Here, the judgment to regard the sheet size as coincident with the sheet size designated in the print data is made on the basis of setting information (the substitute sheet information) stored in a storage unit such as a memory. In this embodiment, the substitute sheet information is set such that the sheet size "A4" can be regarded as coincident with the sheet size "letter size", for example.

In step S35, upon the judgment that there is the sheet (s) whose size can be regarded as coincident with the sheet size designated in the print data, sheet tray selection unit 131 re-selects one of the sheet tray on the basis of the sheet size that can be regarded as coincident (on the basis of the substitute sheet information). In step S36, sheet tray selection unit 131 judges whether or not the sheet whose size can be regarded as coincident is coincident with the sheet size in the re-selected sheet tray. The processing proceeds to step S37 when the sheet whose size can be regarded as coincident is coincident with the sheet size in the re-selected sheet tray, or proceeds to step S33 when the sheet sizes are not coincident.

Figure 4B:
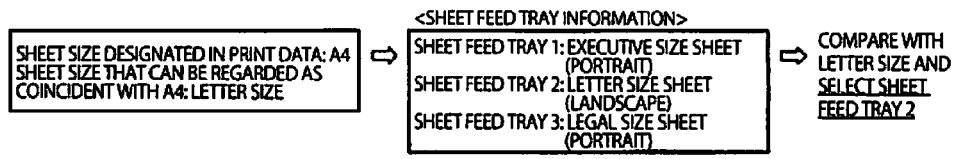
Figure 4C:
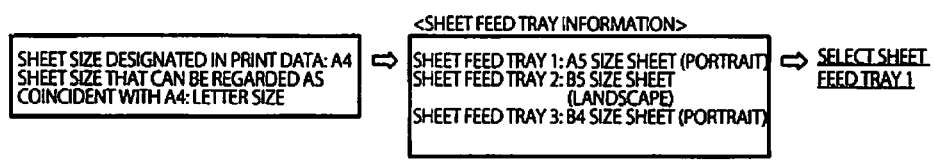

For example, as illustrated in FIG. 4B, when there is a sheet tray 2 containing the sheet in the letter size, which is the sheet size that can be regarded as coincident with the sheet size A4 designated in the print data, sheet tray selection unit 131 selects sheet tray 2. As illustrated in FIG. 4C, when the letter size sheet(s) is not found in any of the sheet trays, sheet tray selection unit 131 selects sheet tray 1. When these sheet sizes are not coincident even after the re-selection and when there are no other sheet sizes that can be regarded as coincident with the sheet size designated in the print data, sheet tray selection unit 131 selects the sheet tray (sheet tray 1 in FIG. 4C) selected on the basis of the sheet size designated in the print data.

In step S37, upon the judgment that the sheet size in the re-selected sheet tray is coincident with the sheet size that can be regarded as coincident with the sheet size designated in the print data, sheet tray selection unit 131 selects the sheet tray re-selected in step S35 and terminates the processing. Back to FIG. 2, the processing from step S3 on is described. In step S3, sheet tray selection unit 131 judges whether or not the sheet size designated in the print data is coincident with the sheet size in the sheet tray. The processing proceeds to step S4 when sheet tray selection unit 131 judges that the sheet sizes are coincident, or proceeds to step S5 when sheet tray selection unit 131 judges that the sheet sizes are not coincident.

In step S4, upon the judgment that the sheet size designated in the print data is coincident with the sheet size in the selected sheet tray, sheet tray selection unit 131 determines to align a page edit orientation with the orientation of the sheet in the selected sheet tray. Then, the processing proceeds to step S9. In step S5, upon the judgment that the sheet size in the selected sheet tray is not coincident with the sheet size designated in the print data, sheet tray selection unit 131 judges whether or not the sheet size in the sheet tray is the sheet size that can be regarded as coincident with the sheet size designated in the print data (that is, sheet tray selection unit 131 judges whether or not the sheet (s) whose size is the same as the substitute sheet size predetermined as substitute for the designated sheet size is found) and it is therefore possible to perform the printing without issuing a request of a sheet(s) whose size is coincident with the designated sheet size. The processing proceeds to step S7 when sheet tray selection unit 131 judges that it is possible to perform the printing without issuing the sheet request. The processing proceeds to step S6 when sheet tray selection unit 131 judges that it is not possible to perform the printing without issuing the sheet request.

In step S6, upon the judgment that the sheet size in the sheet tray is not coincident with or cannot be regarded as coincident with the sheet size designated in the print data, sheet tray selection unit 131 defines the page edit orientation as a standard orientation for the sheet size designated in the print data, such as the landscape orientation as for the sheet size that can be arranged in the landscape orientation, or the portrait orientation as for the sheet size that cannot be arranged in the landscape orientation. Then, the processing proceeds to step S9. In step S7, upon the judgment in step S5 that the sheet size in the selected sheet tray is the sheet size that can be regarded as coincident with the sheet size designated in the print data (that is, upon the judgment in step S5 that the sheet(s) having the same size as the predetermined substitute sheet size for the designated sheet size is found) and it is therefore possible to perform the printing without issuing the sheet request, sheet tray selection unit 131 defines the page edit orientation in accordance with the orientation of the sheet in the selected sheet tray.

In step S8, when the sheet size in the selected sheet tray is the sheet size that can be regarded as coincident with the sheet size designated in the print data, edit region setup unit 132 stores the intermediate code that sets a clip region based on the sheet size in the sheet tray, so as not to print a portion of the print data that extends out of the sheet in the selected sheet tray.

The clip region is set as a portion where the sheet whose size is the designated sheet size in the print data overlaps the sheet in the selected sheet tray. For example, in the case of the printer configured to perform printing with a center alignment in a direction orthogonal to a moving direction of the sheet, the center of page image having the designated sheet size in the print data (the center of the sheet having the designated sheet size in the print data) is aligned with the center of the sheet in the in the selected sheet tray, in the direction orthogonal to the moving direction of the sheet, and the portion where the page image in the print data overlaps the sheet in the selected sheet tray is set as the clip region.

Figures 5A, 5B:
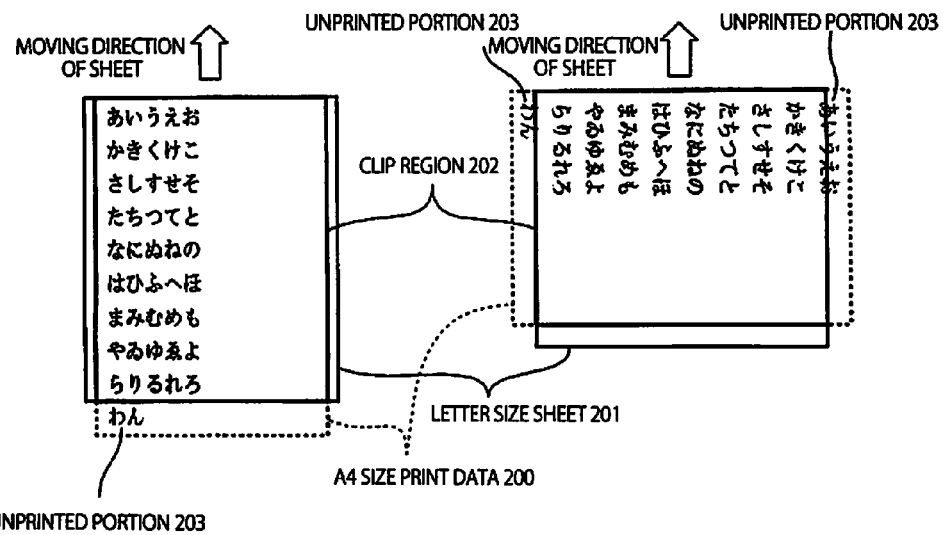
FIGS. 5A and 5B are explanatory diagrams of clip region setting of the first embodiment.

FIGS. 5A and 5B are explanatory diagrams of the clip region setting of the first embodiment. FIG. 5A illustrates the case of arranging the sheet in the portrait orientation while defining an upward direction in the Figure as the moving direction of the sheet and aligning the center of the letter size sheet (the sheet in the selected sheet tray) with the center of the A4 size sheet (the page image of the print data) in the direction orthogonal to the moving direction of the sheet. FIG. 5B illustrates the case of arranging the sheet in the landscape orientation while defining an upward direction in the Figure as the moving direction of the sheet and aligning the center of the letter size sheet (the sheet in the selected sheet tray) with the center of the A4 size sheet (the page image of the print data) in the direction orthogonal to the moving direction of the sheet. In each of FIGS. 5A and 5B, a portion where A4 size print data 200 indicated with a dashed line overlaps a letter size sheet 201 indicated with a solid line represents a clip region 202. Here, each unprinted portion 203 is a portion where part of the A4 size print data 200 extends off the letter size sheet 201, so that the print data in such an unprinted portion 203 is not printed on the letter size sheet 201.

In step S9, after the edit orientation of the print data is determined, drawing execution unit 135 analyzes (edits) the print data in accordance with the edit orientation and creates a drawing object as an intermediate code. Then, drawing execution unit 135 stores the created intermediate code in intermediate code storage unit 195. When drawing execution unit 135 completes the processing of the print data for one page, edit unit 130 sends a notice to development unit 140. In step S10, upon receipt of the notice, development unit 140 reads the intermediate code stored in intermediate code storage unit 195, then develops the intermediate code into the print image, and stores the print image in print image data storage unit 196. Thereafter, development unit 140 sends a notice to control unit 150.

In step S11, control unit 150 judges whether or not the sheet size in the selected sheet tray is coincident with the sheet size designated in the print image data. The processing proceeds to step S13 when control unit 150 judges that the sheet sizes are coincident, or proceeds to step S12 when control unit 150 judges that the sheet sizes are not coincident. In step S12, control unit 150 regards the sheet size in the selected sheet tray as coincident with the sheet size designated in the print image data based on the predetermined substitute sheet size information, and judges whether or not it is possible to perform the printing without issuing the sheet request. The processing proceeds to step S13 when control unit 150 judges that it is possible to perform the printing without issuing the sheet request. The processing proceeds to step S14 when control unit 150 judges that it is not possible to perform the printing without issuing the sheet request.

In step S13, upon the judgment that the sheet size in the sheet tray is coincident with the sheet size designated in the print image data or the judgment that it is possible to perform the printing without issuing the sheet request while regarding the sheet sizes as coincident, control unit 150 reads the print image data out of print image data storage unit 196, then forwards the print image data to image formation unit 160, and controls the components of image formation unit 160 in an integrated manner. Image formation unit 160 executes the print processing in accordance with the control by control unit 150, and then terminates the processing. In step S14, upon the judgment that the sheet size in the selected sheet tray is not coincident or cannot be regarded as coincident with the sheet size designated in the print data, control unit 150 instructs panel unit 170 to display a request for the sheet having the same sheet size as the designated sheet size designated in the print image data, and then terminates the processing.

As described above, even when the sheet size designated in the print image data is different from the sheet size in the selected sheet tray, it is possible to regard the sheet size designated in the print image data as coincident with the sheet size in the selected sheet tray, and thus to perform the printing. In this embodiment, a print result when the sheet size in the selected sheet tray can be regarded as coincident with the sheet size designated in the print image data is as illustrated in FIGS. 6A and 6B, since the intermediate code for the portion that extends out of the sheet in the selected sheet tray is not created.

Figures 6A, 6B:
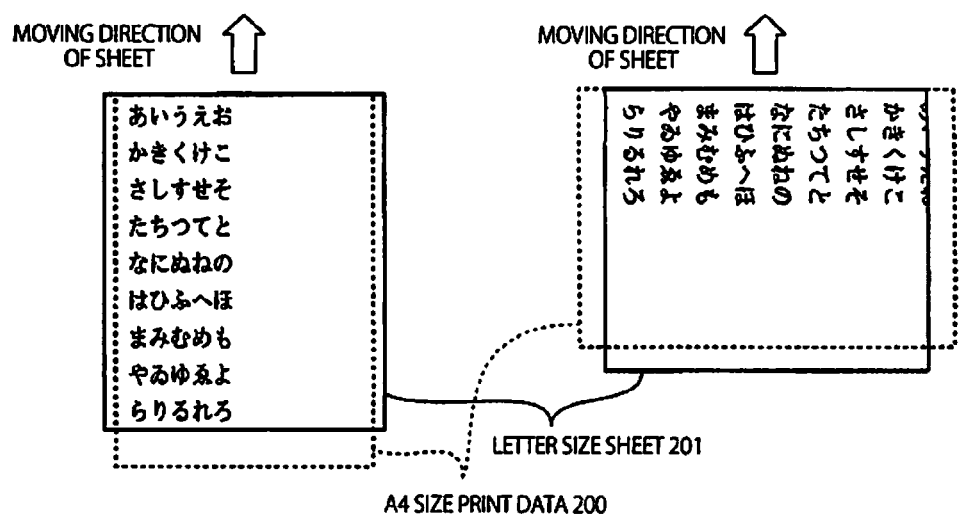
FIGS. 6A and 6B are explanatory diagrams of print results on a substitute print sheet according to the first embodiment.

FIGS. 6A and 6B are explanatory diagrams of print results on the substitute print sheet according to the first embodiment. FIG. 6A illustrates the case of arranging the sheet in the portrait orientation while defining an upward direction in the Figure as the moving direction of the sheet and aligning the center of the sheet in the selected sheet tray with the center of the clipped print image in the direction orthogonal to the moving direction of the sheet. Meanwhile, FIG. 6B illustrates the case of arranging the sheet in the landscape orientation while defining an upward direction in the drawing as the moving direction of the sheet and aligning the center of the sheet in the selected sheet tray with the center of the clipped print image in the direction orthogonal to the moving direction of the sheet. In each of FIGS. 6A and 6B, the portion where A4 size print data 200 indicated with the dashed line overlaps the letter size sheet 201 indicated with the solid line represents the print result (the clipped print image). In other words, unprinted portions 203 illustrated in FIGS. 5A and 5B is deleted and do not exist in the print results.

As described above, printer 100 is configured to determine the edit orientation of the print data in accordance with the orientation of the print medium in the selected sheet tray, which is selected on the basis of the information indicating the size of the print medium designated in the print data, and to edit the print data on the basis of the determined edit orientation. Moreover, when the size of the print medium designated in the print data is different from the size of the print medium in the selected sheet tray, printer 100 is configured to determine (set) the clip region (the edit region) of the print data in conformity to the size of the print medium in the selected sheet tray. Thus, regardless of the orientation of the sheet in the sheet tray, printer 100 can perform the printing on the sheet having the sheet size that can be regarded as being coincident without causing the print data to extend off the sheet size. In addition, printer 100 does not create the print image data corresponding to the portions extending off the region equivalent to the sheet size of the sheet tray at the stage of creation of the intermediate code. Thus, printer 100 can reduce processing time before the start of the printing, thereby starting the printing earlier.

As described above, in the first embodiment, the edit orientation of the print data is determined in accordance with the orientation of the print medium in the selected sheet tray, which is selected on the basis of the information indicating the size of the print medium included in the print data. Then, the print data is edited on the basis of the determined edit orientation. Further, when the size of the print medium designated in the print data is different from the size of the print medium in the selected sheet tray, the clip region (the edit region) of the print data is determined (set) in conformity to the size of the print medium in the selected sheet tray. Thus, the first embodiment achieves an effect of preventing the print result from varying significantly depending on the orientation of the fed sheet. The first embodiment also achieves an effect that it is possible to perform the printing on the sheet from the selected sheet tray having the sheet size that can be regarded as being coincident, without causing the print image to extend out of the sheet fed from the selected sheet tray. Further, the first embodiment can also achieve an effect that it is possible to reduce processing time before the start of the printing, thereby starting the printing earlier.

[Second Embodiment]

Figure 7:
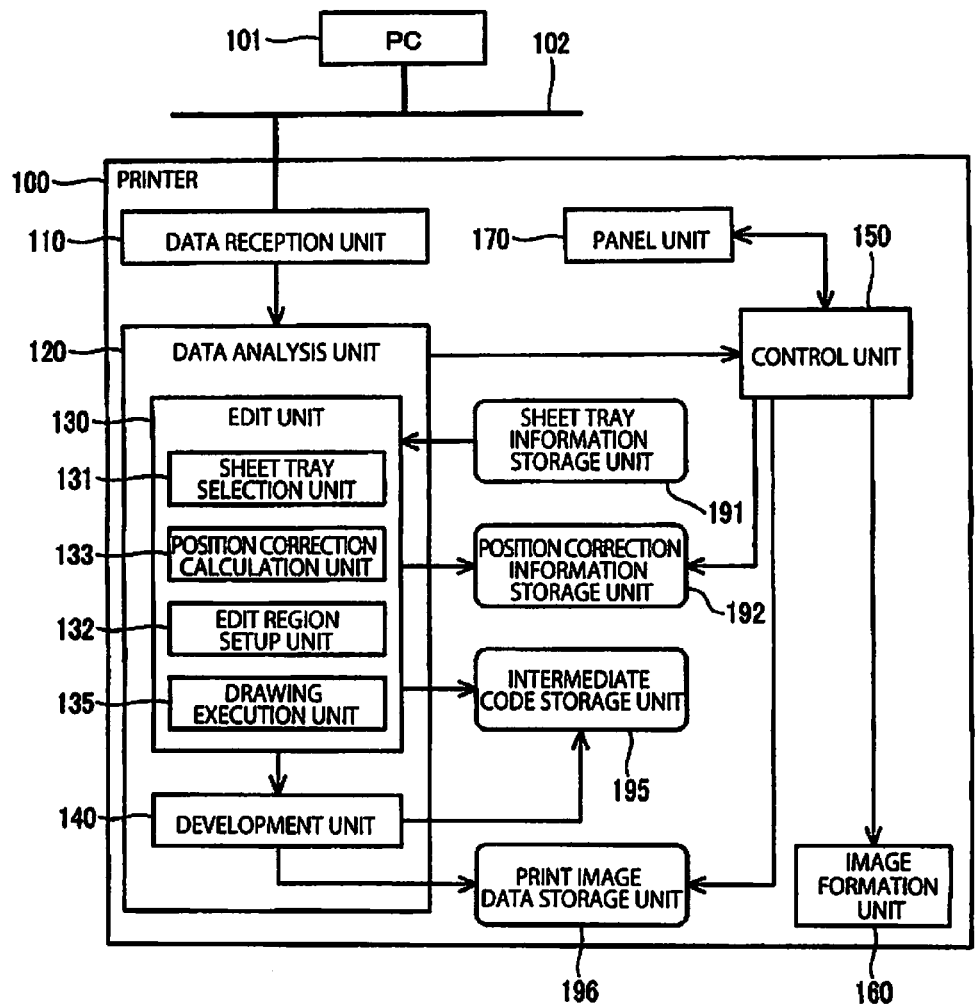
FIG. 7 is a block diagram illustrating a configuration of a printer of a second embodiment.

FIG. 7 is a block diagram illustrating a configuration of a printer of a second embodiment. In the second embodiment illustrated in FIG. 7, position correction calculation unit 133 is provided in edit unit 130 illustrated in the first embodiment. Moreover, position correction information storage unit 192 to store information on a result of position correction calculation is added to the first embodiment. Note that portions similar to those in the above-described first embodiment are designated by the same reference numerals and relevant descriptions are omitted. Position correction calculation unit 133 as a position correction unit is configured to correct a drawing position of the print data on the print medium fed from the sheet tray selected by sheet tray selection unit 131 when the size of the print medium designated in the print data is different from the size of the print medium in the sheet tray selected by sheet tray selection unit 131. Position correction calculation unit 133 calculates a position correction amount of the print data in accordance with the orientation of the sheet in the selected sheet tray, and stores the position correction amount in position correction information storage unit 192.

Position correction information storage unit 192 stores the information on the position correction amount calculated by position correction calculation unit 133. The information stored in position correction information storage unit 192 is read by control unit 150 when performing the printing, and is used as a position correction instruction to image formation unit 160. Image formation unit 160 corrects the drawing position of the image data created by development unit 140 on the basis of the instructed position correction of the printed data, and then performs the printing.

Figure 8:
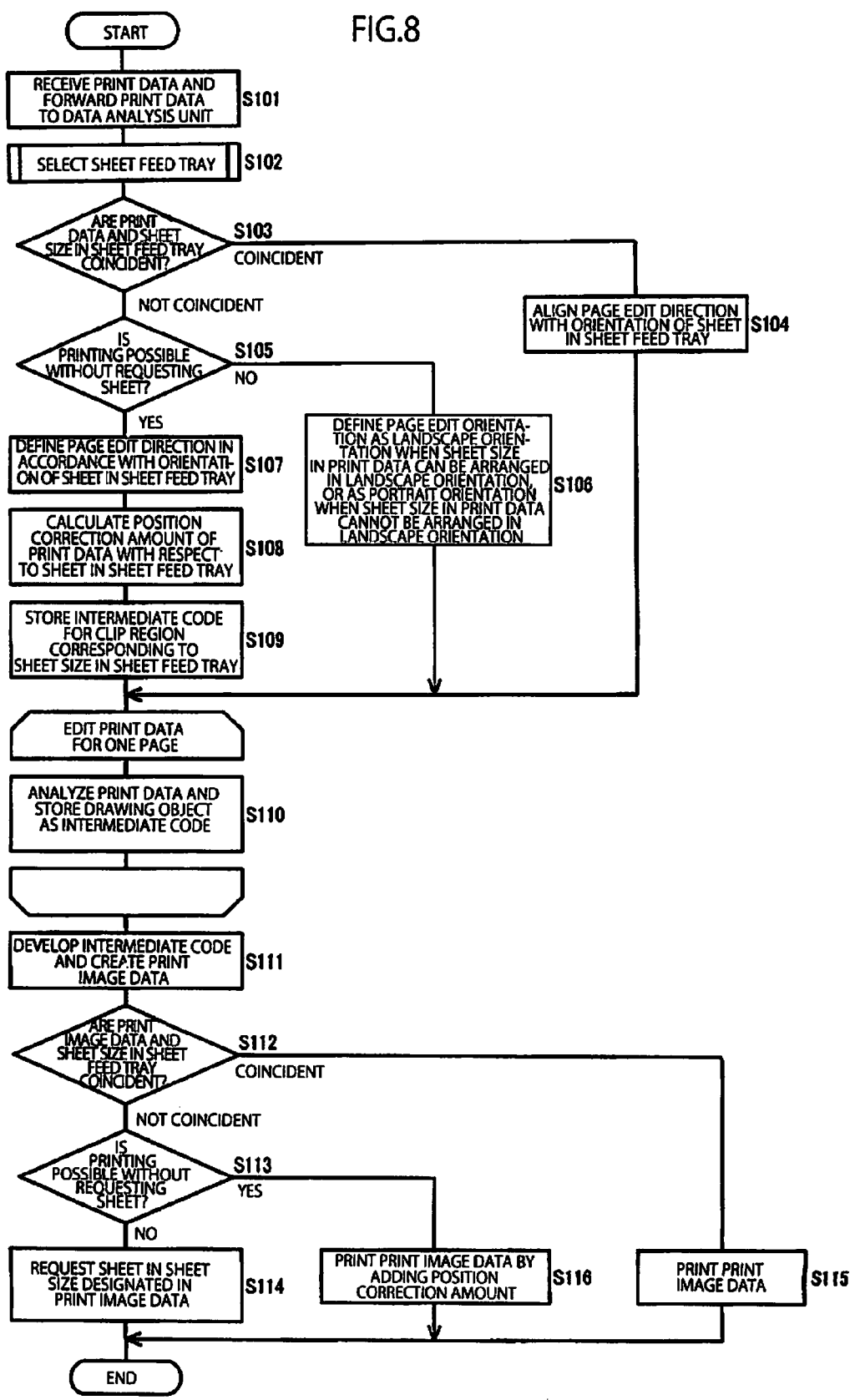
FIG. 8 is a flowchart illustrating a flow of print processing of the second embodiment.

Operations of the above-described configuration are described below. Print processing to be performed by the printer is described with reference to FIG. 7 and in accordance with steps indicated with S in a flowchart of FIG. 8 that represents a flow of the print processing of the embodiment. Steps S101 to S107 are the processing similar to steps S1 to S7 in FIG. 2, and the descriptions of the steps are therefore omitted. In step S108, when the sheet size in the selected sheet tray is the sheet size that can be regarded as coincident with the sheet size designated in the print data, position correction calculation unit 133 calculates the position correction amount based on the edit orientation determined in step S107, and stores the position correction amount in position correction information storage unit 192.

Figures 9A, 9B:
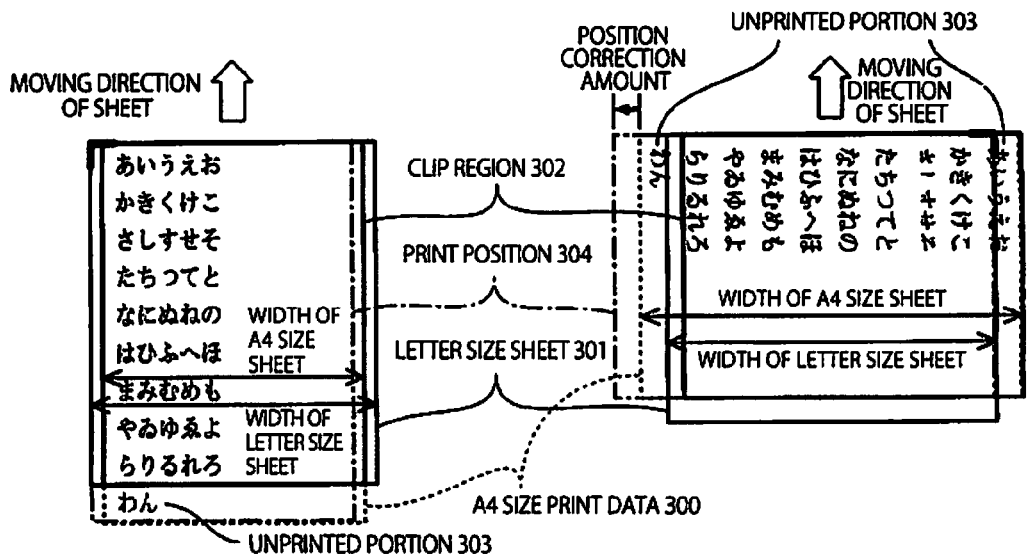
FIGS. 9A and 9B are explanatory diagrams of position correction amounts and clip region setting of the second embodiment.

As illustrated in FIGS. 9A and 9B, for example, when an upper left corner (a reference position) of the A4 size print data 200 is aligned with a position of an upper left corner (a reference position) of the letter size sheet 201 by arranging the sheet in the portrait orientation, a length equal to a half of a difference between a sheet width (a width in the direction orthogonal to the moving direction of the sheet) designated in the print data and a sheet width in the selected sheet tray is defined as the position correction amount. Here, the position correction amount is used for correction in the rightward direction when the sheet width in the sheet tray is narrower than the sheet width of the designated sheet size designated in the print data and for correction in the leftward direction when the sheet width in the selected sheet tray is wider than the sheet width of the designated sheet size designated in the print data (FIG. 9A). On the other hand, when the sheet is arranged in the landscape orientation, a length equal to a half of a difference between a sheet length (a length in the moving direction of the sheet) designated in the print data and a sheet length in the sheet tray is defined as the position correction amount. Here, the position correction amount is used for correction in the leftward direction when the sheet length in the selected sheet tray is shorter than the width of the designated sheet size designated in the print data and for correction in the rightward direction when the sheet length in the selected sheet tray is longer than the width of the designated sheet size designated in the print data (FIG. 9B).

Meanwhile, print position 304 indicated with a chain dashed line in each of FIGS. 9A and 9B represents a result of the position correction of A4 size print data 300 in such a way as to align the upper left end of the A4 size print data 300 with the position of the upper left end of letter size sheet 301. As described above, position correction calculation unit 133 corrects the drawing position on the basis of the difference between the size of the print medium designated in the print data and the size of the print medium in the sheet tray selected by sheet tray selection unit 131, and in such a way as to align the drawing position of an end of the print data with an end of the print medium in the sheet tray selected by sheet tray selection unit 131.

In step S109, edit region setup unit 132 stores the clip region in the intermediate code while taking into consideration the position correction amount of the print data stored in position correction information storage unit 192. In the examples of FIGS. 9A and 9B, clip region 302 having the same sheet size as that in the first embodiment and being shifted in such a way as to be aligned with the position of the upper left end in the portrait orientation of the sheet, is stored as the intermediate code. Steps S110 and S111 are the processing similar to steps S9 and S10 in FIG. 2, and the descriptions of the steps are therefore omitted. In step S112, control unit 150 judges whether or not the sheet size in the sheet tray is coincident with the sheet size designated in the print image data. The processing proceeds to step S115 when control unit 150 judges that the sheet sizes are coincident, or proceeds to step S113 when control unit 150 judges that the sheet sizes are not coincident.

In step S113, control unit 150 regards the sheet size designated in the print image data as coincident with the sheet size in the sheet tray, and judges whether or not it is possible to perform the printing without issuing the sheet request. The processing proceeds to step S116 when control unit 150 judges that it is possible to perform the printing without issuing the sheet request. The processing proceeds to step S114 when control unit 150 judges that it is not possible to perform the printing without issuing the sheet request. In step S114, upon the judgment that it is not possible to perform the printing without issuing the sheet request, control unit 150 instructs panel unit 170 to display the request for the sheet in the sheet size designated in the print image data, and then terminates the processing.

In step S115, upon the judgment that the sheet size in the sheet tray is coincident with the sheet size designated in the print image data in step S112, control unit 150 reads the print image data out of print image data storage unit 196 and forwards the print image data to image formation unit 160. Meanwhile, control unit 150 controls the modules that constitute image formation unit 160 in an integrated manner. Image formation unit 160 executes the print processing in accordance with the control by control unit 150, and then terminates the processing.

In step S116, upon the judgment that the sheet size in the sheet tray is not coincident with the sheet size designated in the print data but it is possible to perform the printing by regarding the sheet sizes as being coincident in S113, control unit 150 reads the print image data out of print image data storage unit 196, adds to the print image data the correction corresponding to the position correction amount read out of position correction information storage unit 192, forwards the corrected print image data to image formation unit 160, and controls the modules that constitute image formation unit 160 in an integrated manner. Image formation unit 160 executes the print processing in accordance with the control by control unit 150, and then terminates the processing. Print results when the sheet size in the sheet tray can be regarded as coincident with the sheet size designated in the print image data are as illustrated in FIGS. 10A and 10B, owing to the correction of the position of clip region 302 with respect to the print data and the print data position with respect to the sheet in the sheet tray.

Figures 10A, 10B:
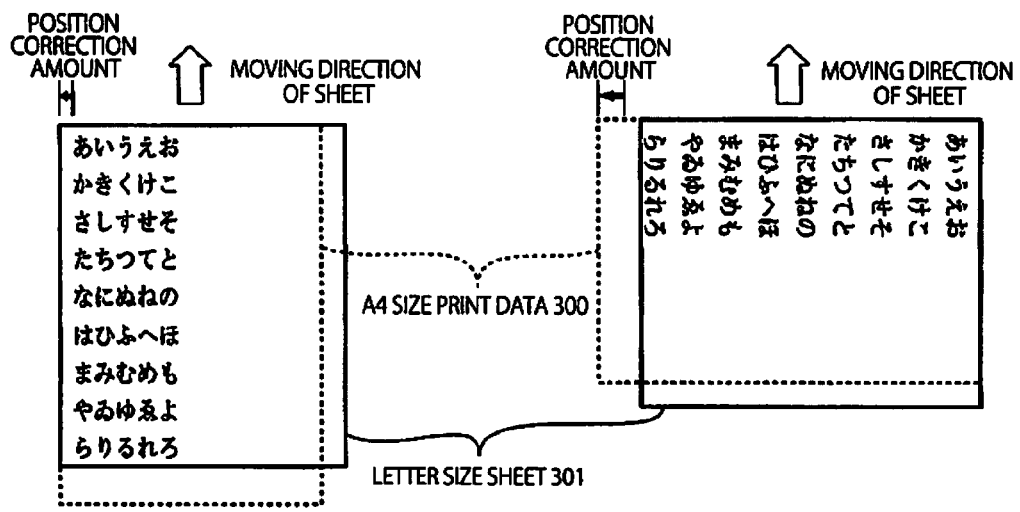
FIGS. 10A and 10B are explanatory diagrams of print results on a substitute print sheet of the second embodiment.

FIGS. 10A and 10B are explanatory diagrams of the print results when the sheet sizes are regarded as being coincident. FIG. 10A illustrates the case of arranging the sheet in the portrait orientation and FIG. 10B illustrates the case of arranging the sheet in the landscape orientation. When an upper left end of the A4 size print data 300 is aligned with a position of an upper left end of the letter size sheet 301 by arranging the sheet in the portrait orientation as is the case illustrated in FIG. 9, a length equal to a half of a difference between a sheet width designated in the print data and a sheet width in the sheet tray is used for correction. Here, the length is used for correction in the rightward direction in the drawing when the sheet width in the sheet tray is narrower and for correction in the leftward direction when the sheet width in the sheet tray is wider (FIG. 10A).

On the other hand, when the sheet is arranged in the landscape orientation, a length equal to a half of a difference between a sheet length designated in the print data and a sheet length in the sheet tray used for correction. Here, the length is used for correction in the leftward direction when the sheet length in the sheet tray is shorter and for correction in the rightward direction when the sheet length in the sheet tray is longer (FIG. 10B). If the position of the upper left end of the sheet designated in the print data is aligned with the position of the upper left end of the sheet in the sheet tray while the print data and the sheet in the sheet tray are aligned with each other at the center of the sheet in the direction orthogonal to the moving direction of the sheet, then the position correction amount of the print data can be expressed as the length equivalent to a half of the difference between the sheet width designated in the print data and the sheet width in the sheet tray.

As described above, the second embodiment achieves the following effect in addition to the effects of the first embodiment. Specifically, even when the size of the sheet in the sheet tray is different from the size of the sheet designated in the print data, it is possible to perform the printing on the sheet having the sheet size that can be regarded as being coincident by correcting the position of the print data. Here, the same print result is obtained irrespective of the orientation of the sheet.

[Third Embodiment]

Figure 11:
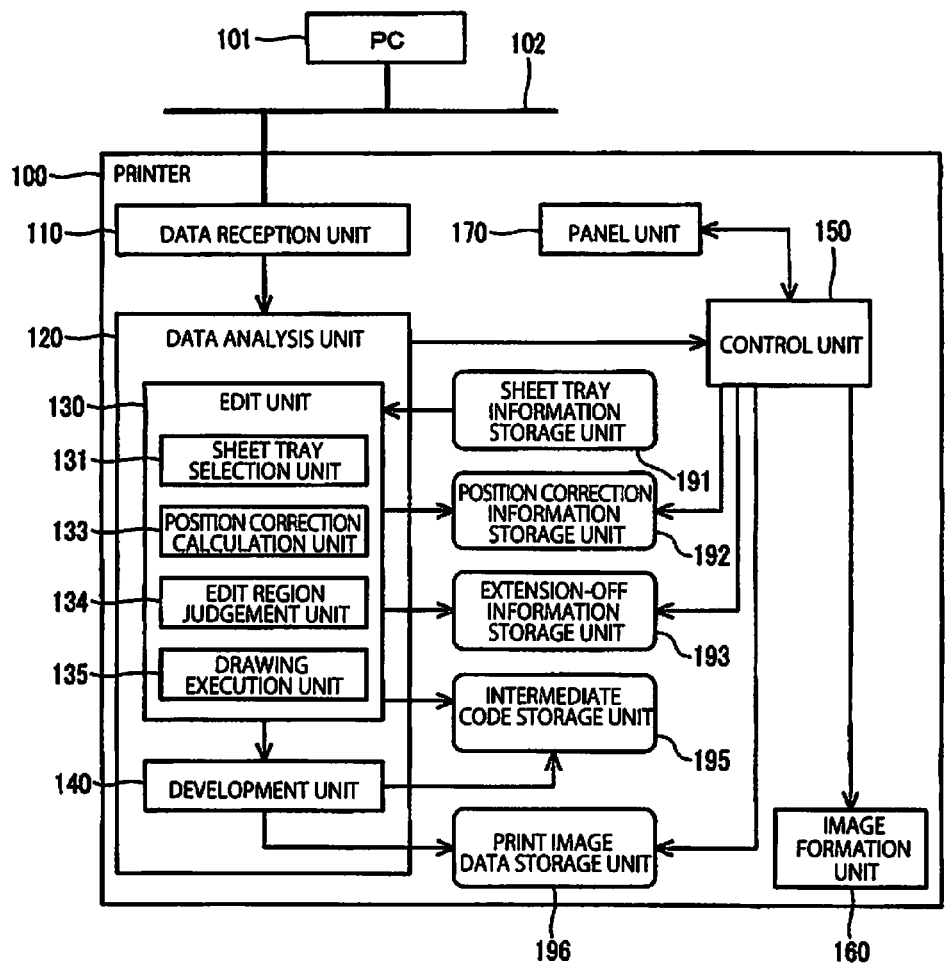
FIG. 11 is a block diagram illustrating a configuration of a printer of a third embodiment.

FIG. 11 is a block diagram illustrating a configuration of a printer of a third embodiment. In the third embodiment, instead of edit region setup unit 132, edit region judgment unit 134 is provided in edit unit 130 of the second embodiment illustrated in FIG. 7. Moreover, extension-off information storage unit 193 to store information as to whether or not the print data extends off the edit region is added to the second embodiment. Note that portions similar to those in the above-described first and second embodiments are designated by the same reference numerals and relevant descriptions are omitted.

Edit region judgment unit 134 is configured to analyze the print data on the basis of the edit orientation determined by sheet tray selection unit 131, and to judge whether or not the image data created on the basis of the print data extends off the print area of the print medium in the selected sheet tray when the size of the print medium designated in the print data is different from the size of the print medium contained in the sheet tray selected by sheet tray selection unit 131. Edit region judgment unit 134 judges whether or not the intermediate code, which is stored in intermediate code storage unit 195 by drawing execution unit 135, remains within the print area and stores a judgment result in extension-off information storage unit 193.

Extension-off information storage unit 193 stores the information as to whether or not the intermediate code being the judgment result by edit region judgment unit 134 extends off the print range. The information stored in extension-off information storage unit 193 is read by control unit 150 when performing the printing, and is used for a judgment as to whether or not the sheet request is to be issued. When edit region judgment unit 134 judges that the intermediate code for creating the image data extends off the print range, control unit 150 causes panel unit 170 to display the request for the print medium.

Figure 12:
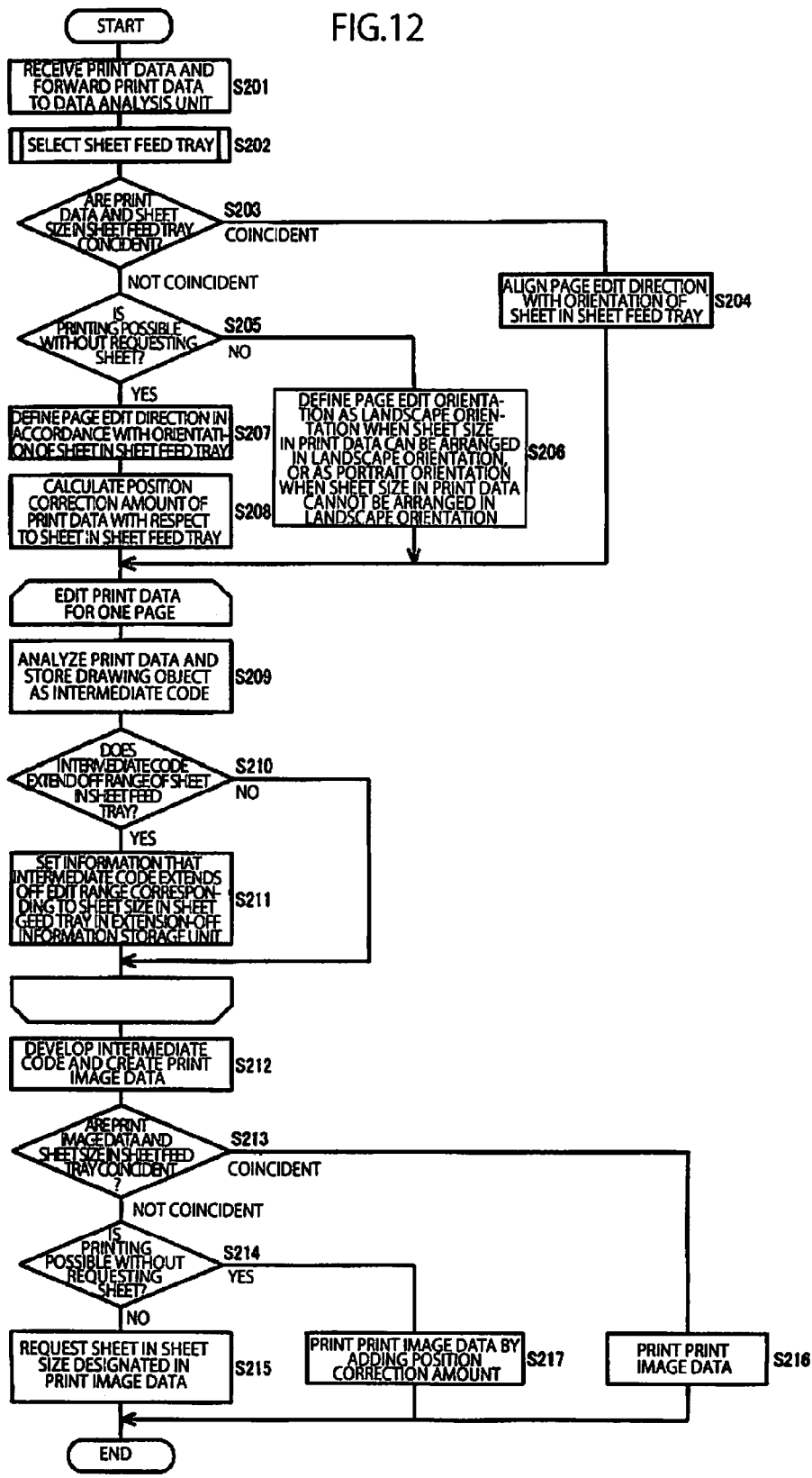
FIG. 12 is a flowchart illustrating a flow of print processing of the third embodiment.

Operations of the above-described configuration are described. Print processing to be performed by the printer is described with reference to FIG. 11 and in accordance with steps indicated with S in a flowchart of FIG. 12 that represents a flow of the print processing of the third embodiment. Steps S201 to S208 are the processing similar to steps S101 to S108 in FIG. 8, and the descriptions of the steps are therefore omitted. Step S209 is the processing similar to step S110 in FIG. 8, and the description of the step is therefore omitted. In step S210, edit region judgment unit 134 judges whether or not the intermediate code stored in the intermediate code storage unit by drawing execution unit 135 remains within the print range. The processing in step S211 is skipped when edit region judgment unit 134 judges that the intermediate code remains within the print range. The processing proceeds to step S211 when edit region judgment unit 134 judges that the intermediate code does not remain within the print range.

In step S211, edit region judgment unit 134 stores information on the presence of the intermediate code extending off the print range in extension-off information storage unit 193. The information stored in extension-off information storage unit 193 is read by control unit 150 when performing the printing and is used for the judgment as to whether or not the sheet request is to be issued. Drawing execution unit 135 repeats the processing from steps S209 to S211. When drawing execution unit 135 completes the processing of the print data for one page, edit unit 130 sends a notice to development unit 140.

In step S212, upon receipt of the notice, development unit 140 reads the intermediate code stored in intermediate code storage unit 195, then develops the intermediate code into the print image, and stores the print image in print image data storage unit 196. Thereafter, development unit 140 sends a notice to control unit 150. In step S213, control unit 150 judges whether or not the sheet size in the sheet tray is coincident with the sheet size designated in the print image data. The processing proceeds to step S216 when control unit 150 judges that the sheet sizes are coincident, or proceeds to step S214 when control unit 150 judges that the sheet sizes are not coincident.

In step S214, control unit 150 judges whether or not the sheet size designated in the print data can be regarded as coincident with the sheet size in the sheet tray, and whether or not the print image data does not extend off the range of the sheet in the sheet tray based on the information in extension-off information storage unit 193. In other words, control unit 150 judges whether or not it is possible to perform the printing without issuing the sheet request. The processing proceeds to step S217 when control unit 150 judges that it is possible to perform the printing without issuing the sheet request. The processing proceeds to step S215 when control unit 150 judges that it is not possible to perform the printing without issuing the sheet request.

In step S215, upon the judgment that it is not possible to perform the printing without issuing the sheet request, control unit 150 instructs panel unit 170 to display the request for the sheet in the sheet size designated in the print image data, and then terminates the processing. Here, a user is supposed to set the appropriate sheet in accordance with the display that requests the sheet in the sheet size designated in the print image data, or to instruct abortion of the printing by using panel unit 170.

In step S216, upon the judgment that the sheet size in the sheet tray is coincident with the sheet size designated in the print image data, control unit 150 reads the print image data out of print image data storage unit 196, and forwards the print image data to image formation unit 160. Meanwhile, control unit 150 controls the modules that constitute image formation unit 160 in an integrated manner. Image formation unit 160 executes the print processing in accordance with the control by control unit 150, and then terminates the processing.

In step S217, upon the judgment that it is possible to perform the printing without issuing the sheet request in step S214, control unit 150 reads the print image data out of print image data storage unit 196, adds to the print image data the correction corresponding to the position correction amount read out of position correction information storage unit 192, forwards the corrected print image data to image formation unit 160, and controls the modules that constitute image formation unit 160 in an integrated manner. Image formation unit 160 executes the print processing in accordance with the control by control unit 150, and then terminates the processing.

As described above, the third embodiment achieves the following effect in addition to the effects of the second embodiment. Specifically, the printing is performed only when the print data remains within the range of the sheet having the sheet size that can be regarded as being coincident. When the print data extends off the range of the sheet, it is possible to seek for a user's judgment as to whether or not the printing should be performed.

In the first and second embodiments, the print image data is created in such a manner not to extend off the print range by setting up the edit region as the clip region in the course of the edit processing. However, when hardware serving as the image formation unit can mask the created print image data, it is also possible to clip the image by using the hardware of the image formation unit instead of clipping the image during the edit processing.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus, comprising:
a tray selection unit configured, on the basis of information indicating a print size designated in print data, to select one of plural medium trays, wherein the tray selection unit is configured, when a print medium whose size corresponds to the designated print size is unavailable for printing, to select one of the medium trays that contains a print medium having a same size as a substitute print medium which is preset as substitute for the print medium corresponding to the designated print size, the size of the substitute print medium being different from the print medium corresponding to the designated print medium size;
an edit region setup unit configured to analyze the print data on the basis of an orientation of the print medium in the selected medium tray and to set an edit region of the print data;
a drawing unit configured, on the basis of the print data and the edit region, to create image data within the edit region;
a memory storing information of the substitute print medium;
an orientation determination unit configured to determine orientations of the long side and the short side of the print data in accordance with orientations of the long side and the short side of the print medium in the selected medium tray that is selected by the tray selection unit; and
an image formation unit configured to print the image data on the print medium fed from the selected medium tray,
wherein the edit region of the print data is different based on whether the substitute print medium is positioned in the image formation apparatus to print in a landscape format or in a portrait format,
wherein the edit region setup unit is configured, when the medium from the selected medium tray is conveyed along the direction of the long side of the medium from the selected medium tray, to set a clip region as the edit region of the print data by clipping a portion of the print data that is overlapped with the print area of the medium from the selected medium tray while aligning, in reference with the determination result determined by the orientation determination unit, the center of the short side of the medium with the center of the short side of the print data on the downstream side thereof in the medium conveyance direction, and
wherein the edit region setup unit is configured, when the medium from the selected medium tray is conveyed along the direction of the short side of the medium, to set a clip region as the edit region of the print data by clipping a portion of the print data that is overlapped with the print area of the medium from the selected medium tray while aligning, in reference with the determination result determined by the orientation determination unit, the center of the long side of the medium with the center of the long side of the print data on the downstream side thereof in the medium conveyance direction.

2. The image formation apparatus according to claim 1, further comprising:
an input unit configured to accept a user input of information of the substitute print medium.

3. The image formation apparatus of claim 2, wherein the input unit is provided in the image formation apparatus.

4. The image formation apparatus of claim 2, wherein the input unit is provided in an external apparatus other than the image formation apparatus.

5. The image formation apparatus according to claim 1, wherein
the information indicating the print size designated in the print data comprises a name of the print medium.

6. The image formation apparatus according to claim 1, wherein
the information indicating the print size designated in the print data comprises a size of the print medium.

7. The image formation apparatus according to claim 1, wherein
the information indicating the print size designated in the print data comprises lengths of a first side and a second side of the print medium.

8. The image formation apparatus according to claim 1, wherein
the information indicating the print size designated in the print data comprises a print area size for the print medium.

9. The image formation apparatus according to claim 1, wherein
the information indicating the print size designated in the print data comprises lengths of a first side and a second side of a print area for the print medium.

10. The image formation apparatus according to claim 1, further comprising:
a position correction unit configured to correct a drawing position of the print data with respect to the print medium from the selected medium tray, when the designated print medium size is different from the size of the print medium in selected the medium tray, wherein
the image formation unit prints the image data at the corrected drawing position.

11. The image formation apparatus according to claim 10, wherein the position correction unit corrects the drawing position on the basis of a difference between the designated print medium size and the size of the print medium in the selected medium tray.

12. The image formation apparatus according to claim 11, wherein the position correction unit is configured to correct the drawing position such that a corner position of the print data is aligned with a corresponding corner position of the print medium in the selected medium tray.

13. The image formation apparatus according to claim 1, wherein
each medium tray is formed to store therein print medium such that a longitudinal direction of the print medium stored in the medium tray is parallel with a moving direction of the print medium along which the print medium is fed from the medium tray or a lateral direction of the print medium is parallel with the moving direction of the print medium.

14. An image formation apparatus, comprising:
a tray selection unit configured, based on information indicating a print size designated in a print data, to select one of plural medium trays, wherein the tray selection unit is configured, when a print medium whose size corresponds to the designated print size is unavailable for printing, to select one of the medium trays that contains a print medium having a same size as a substitute print medium which is preset as a substitute for the print medium corresponding to the designated print size, the size of the substitute print medium being different from the print medium corresponding to the designated print size;
a position correction unit configured, when the print medium corresponding to the designated print size has a different size from the print medium in selected the medium tray, to correct a drawing position of the print data with respect to the print medium from the selected medium tray, based on an orientation of the print medium in the selected medium tray;
a drawing unit configured, on the basis of the print data and the corrected drawing position, to create image data;
a memory storing information of the substitute print medium;
an edit region judgment unit configured to judge if the image data would extend out of a print area of the print medium in the selected medium tray;
an orientation determination unit configured to determine orientations of the long side and the short side of the print data in accordance with orientations of the long side and the short side of the print medium in the selected medium tray that is selected by the tray selection unit; and
a control unit configured, when the edit region judgment unit determines that the image data would extend out of the print area, to display indication requesting for a print medium on a display unit,
wherein the edit region of the print data is different based on whether the substitute print medium is positioned in the image formation apparatus to print in a landscape format or in a portrait format,
wherein the edit region setup unit is configured, when the print medium from the selected medium tray is conveyed along the direction of the long side of the print medium from the selected medium tray, to set a clip region as the edit region of the print data by clipping a portion of the print data that is overlapped with the print area of the print medium from the selected medium tray while aligning, in reference with the determination result determined by the orientation determination unit, the center of the short side of the print medium with the center of the short side of the print data on the downstream side thereof in the medium conveyance direction, and
wherein the edit region setup unit is configured, when the print medium from the selected medium tray is conveyed along the direction of the short side of the print medium, to set a clip region as the edit region of the print data by clipping a portion of the print data that is overlapped with the print area of the print medium from the selected medium tray while aligning, in reference with the determination result determined by the orientation determination unit, the center of the long side of the print medium with the center of the long side of the print data on the downstream side thereof in the medium conveyance direction.

15. An image formation apparatus, comprising:

a tray selection unit configured, based on information indicating a print medium size designated in a print data, to select one of plural medium trays, wherein the tray selection unit is configured, when a print medium whose size corresponds to the designated print size is unavailable for printing, to select one of the medium trays that contains a print medium having a same size as a substitute print medium which is preset as a substitute for the print medium corresponding to the designated print size, the size of the substitute print medium being different from the print medium corresponding to the designated print size;

a position correction unit configured, when the print medium corresponding to the print size designated in the print data has a different size from the print medium in the selected medium tray, to correct a drawing position of the print data with respect to the print medium from the selected medium tray, based on the orientation of the print medium in the selected medium tray, such that a corner position of the print data is aligned with a corresponding corner position of the print medium in the selected medium tray;

an edit region setup unit configured, based on the orientation of the print medium in the selected medium tray and the corrected drawing position, to analyze the print data and to set an edit region of the print data;

a drawing unit configured, based on the print data and the edit region to create an image data in the edit region;

a memory storing information of the substitute print medium;

an orientation determination unit configured to determine orientations of the long side and the short side of the print data in accordance with orientations of the long side and the short side of the print medium in the selected medium tray that is selected by the tray selection unit, and an image formation unit configured to print the image data on the print medium fed from the selected medium tray, wherein the edit region of the print data is different based on whether the substitute print medium is positioned in the image formation apparatus to print in a landscape format or in a portrait format, wherein the edit region setup unit is configured, when the print medium from the selected medium tray is conveyed along the direction of the long side of the print medium from the selected medium tray, to set a clip region as the edit region of the print data by clipping a portion of the print data that is overlapped with the print area of the print medium from the selected medium tray while aligning, in reference with the determination result determined by the orientation determination unit, the center of the short side of the print medium with the center of the short side of the print data on the downstream side thereof in the medium conveyance direction, and wherein the edit region setup unit is configured, when the print medium from the selected medium tray is conveyed along the direction of the short side of the print medium, to set a clip region as the edit region of the print data by clipping a portion of the print data that is overlapped with the print area of the print medium from the selected medium tray while aligning, in reference with the determination result determined by the orientation determination unit, the center of the long side of the Print medium with the center of the long side of the print data on the downstream side thereof in the medium conveyance direction.

* * * * *